Dec. 14, 1937.  H. C. SCHILDMEIER  2,102,439
WHEEL REPAIRING MECHANISM
Filed May 1, 1935  4 Sheets-Sheet 1

INVENTOR.
HENRY C. SCHILDMEIER
BY Owen H. Spencer
ATTORNEY.

Dec. 14, 1937.   H. C. SCHILDMEIER   2,102,439
WHEEL REPAIRING MECHANISM
Filed May 1, 1935   4 Sheets-Sheet 3

INVENTOR
HENRY C. SCHILDMEIER
BY Owen H. Spencer
ATTORNEY.

Dec. 14, 1937.  H. C. SCHILDMEIER  2,102,439
WHEEL REPAIRING MECHANISM
Filed May 1, 1935  4 Sheets-Sheet 4

INVENTOR.
HENRY C. SCHILDMEIER
BY
Owen H. Spencer
ATTORNEY.

Patented Dec. 14, 1937

2,102,439

UNITED STATES PATENT OFFICE 2,102,439

WHEEL REPAIRING MECHANISM

Henry C. Schildmeier, Indianapolis, Ind.

Application May 1, 1935, Serial No. 19,227

8 Claims. (Cl. 153—32)

The invention is a machine for repairing wheels and more especially for repairing all-metal vehicle wheels and consists substantially in the construction, combination and related elements hereinafter pointed out and recited more particularly in the claims.

It is a primary object of the invention to provide a means for concentrically, removably and rotatably mounting the hub of the vehicle wheel, and of then drawing and bending disfigured wheels to their original shape; and to provide a device of this class in which all points of the wheel rim and spokes, may be readily rotated to the most accessible position for the operator.

It is also a primary object of the invention to provide a device of this class which can be adjustably applied to wheels of a variety of sizes and designs, and by which an enormous bending pressure may be applied selectively to different parts of the wheel in different directions and different manners, as desired.

The above and other objects are attained by the construction and related parts illustrated in the accompanying drawings, in which.

Figure 1:
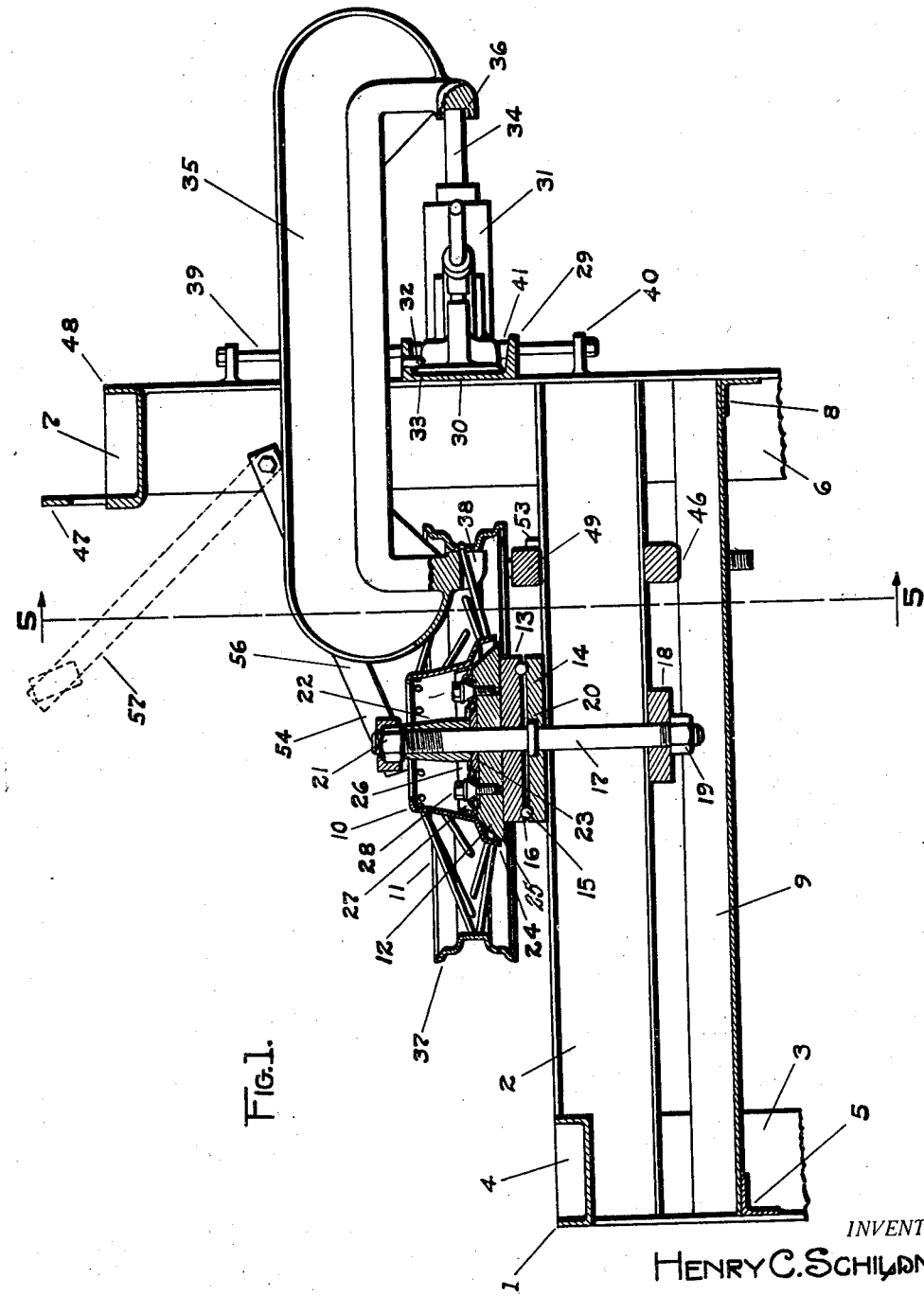
Figure 1 is a sectional view taken in the proximity of line 1—1 of Fig. 2 and illustrates the manner of using the device to apply outward bending thrust to any selected part of the wheel rim.
Figure 4:
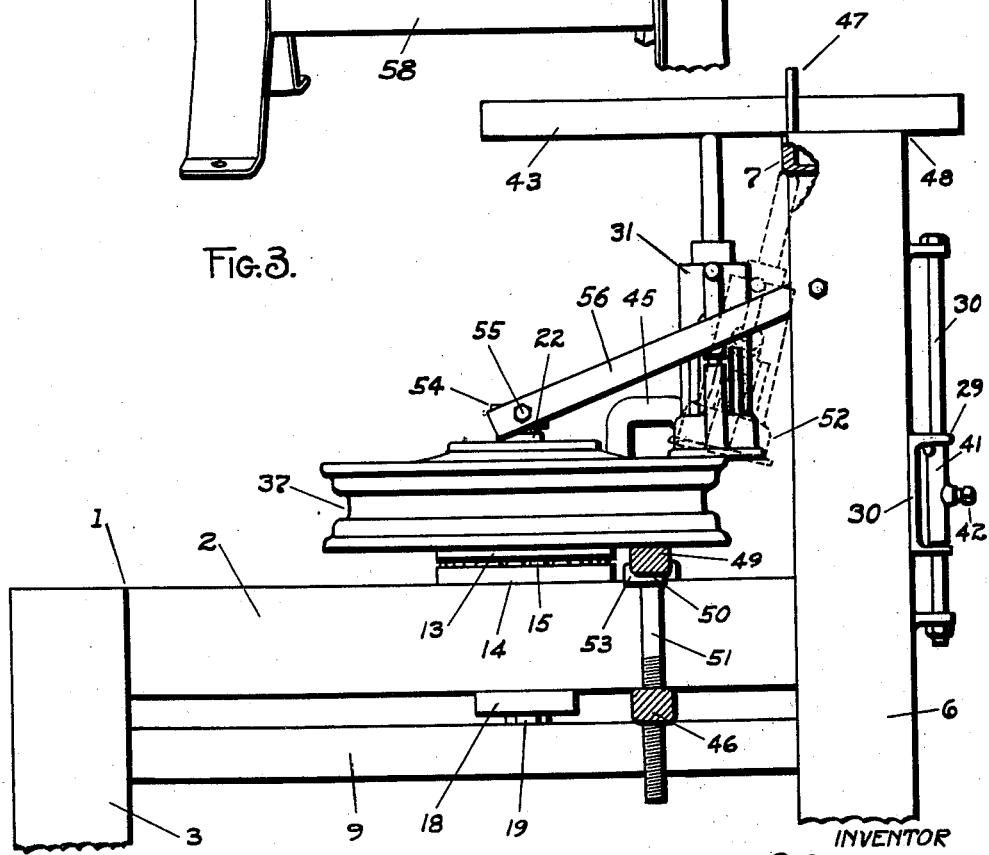
Figure 5:
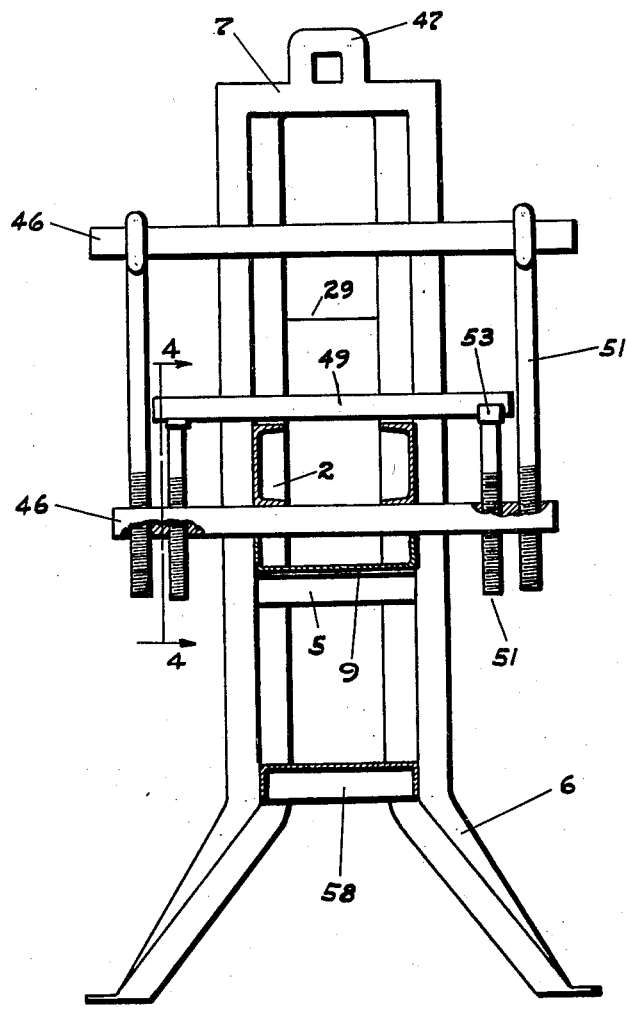

Fig. 4 is a side elevation of the device, a part of which is a sectional view taken as in the proximity of line 4—4 of Fig. 5, and illustrates the use of the device in applying thrust oppositely to the manner in which thrust is applied in Figure 1; and, Fig. 5 is a sectional view taken in the proximity of line 5—5 of Fig. 1, the device being shown with some of the sundry parts omitted, and with the work removed.

Similar characters of reference designate similar parts throughout the several views.

Referring to the different views, the numeral 1 designates the stationary frame of the device, the bed of which consists of the two parallel and spaced channels 2, a respective end of each of said channels being integrally secured to the upper end of one of the pair of legs 3, said respective ends being tied together by an inverted cross channel 4 at the junction of same with said legs, and said legs being further connected by an angle iron 5 which is spaced below said channels. The other ends of the channels 2 are each secured to one of the pair of legs 6, which extend a considerable distance above said channels and which are integrally united at their upper ends by the inverted cross channel 7, an angle iron 8 uniting said legs below and at a distance from the channels 2, correspondingly to the uniting of the legs 3 by the angle iron 5. As another principal part of the frame 1, the inverted channel 9 is supported, one end on each of the cross angle irons 5 and 8, said inverted channel being parallel and spaced from the channels 2.

Referring to Figure 1 the hub 10 of the vehicle wheel 11 is supported by the hub receiving plate 12 so that the axial line of said hub is substantially vertical. Said plate is in turn mounted upon the turn table 13, said turn table being rotatably supported on the turn table base 14 by a set of bearing balls 15, said turn table and base each having a corresponding ball groove 16 concentric with the vehicle wheel hub, in which said balls are confined. Centrally with said grooves, the stud 17 is disposed vertically through said turn table and base, and downwardly through the cross bar 18, which is confined upwardly against the lower side of the channels 2 by the nut 19 which engages said stud directly below said cross bar, said stud bearing a shoulder 20 which nests in a corresponding recess formed in the upper face of the turn base 14, by which arrangement it will be understood that said turn table is retained on the base 14 by said stud and bar.

The stud 17 extends upwardly from the shoulder 20, through the plate 12 and beyond the wheel hub 10 and is provided with a nut 21, which serves to retain said plate on the turn table 13, the sleeve type spacer 22, and the wheel hub pilot 23 being strung on said stud between said nut and plate and said pilot being confined thereagainst by said sleeve, and the nut 21 being tensioned directly against the upper end of said sleeve.

It will be understood that the invention is adaptable to support a large variety of wheels for repairing same and that in thus constructing the device for somewhat universal use in this respect, plates and pilots of different dimensions and character may be interchangeably substituted for the plate 12, and pilot 23. For example such plate and pilot may be constructed of one piece or any number of pieces considered feasible, as conditions may require, in adapting the machine to the repair of wheels of other design and size, so as to bend the same at different parts in different directions as the case may require while being co-ordinately hammered to proper shape under heat or otherwise.

In placing the example of wheel 11 shown, on the device, the flared edge 24 of the wheel hub 10 is approximately guided into position by the conically beveled edge portion 25 of the plate 12. As the wheel hub is slid farther onto said plate, the hole 26 which is formed in the web 27 of said hub, engages the pilot 23 and guides the wheel more nearly to the final position. The bolts 28 are then used to hold and draw the wheel firmly in place by their threaded engagement with said web; and in securing this example of wheel the bolts used have tapered heads which engage corresponding depressions in the web, and bring the wheel hub to the desired final position for carrying out the repairs on the wheel, although it will readily be seen that any size or type of screw may be used as required in securing the particular wheel in place, the plate 12 being selected to accommodate the particular wheel to be repaired.

Figure 2:
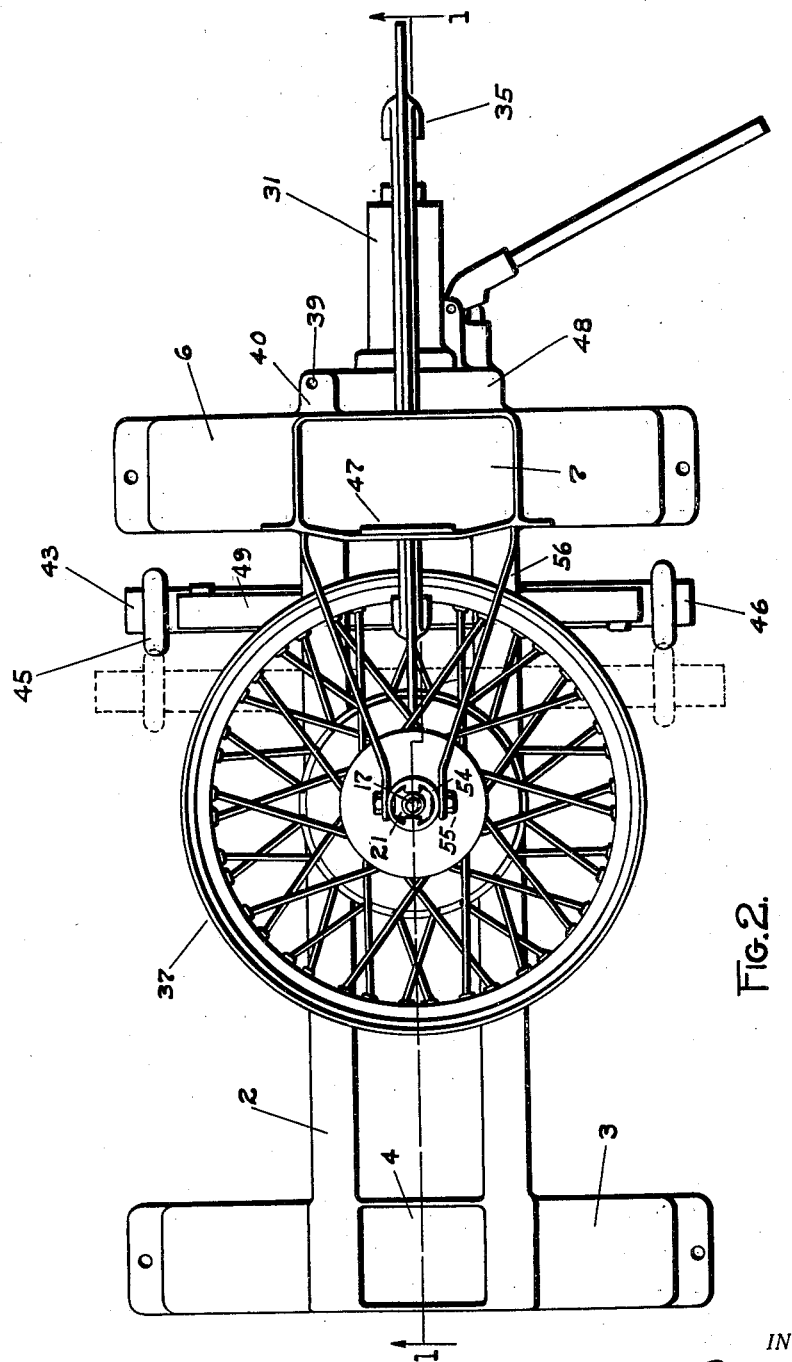
Fig. 2 is a plan view as of Figure 1.

When in use, the jack seat 29 is swung across the legs 6 on the side opposite from the turn table 13, and at approximately the same height as the wheel under repair as illustrated in Figure 1 and Fig. 2. Said seat is conveniently constructed from a piece of channel iron the web 30 of which contacts said legs and the flanges of which extend horizontally across same. The portable jack 31 is supported horizontally by said seat the normally bottom or foot surface of which embraces the web 30 between said flanges, the upper one of which is provided with pins 32 which confine the respective edge 33 of the jack base in juxtaposition with said web and prevent casual falling of the jack from the seat, when not under working tension.

Still referring more especially to Fig. 1, it will be seen that the bit 34 of the jack 31 is directed horizontally from the device against one jaw of the C bar 35, said jaw having a socket 36 which receives said bit, the other jaw of said bar being oppositely faced and bearing against the inner surface of the wheel rim 37, by which arrangement it will be understood that the jack 31 is expanded in operating to bend the wheel rim outwardly at the point engaged by the bar 35 in restoring "egg-shaped" wheels or the like to correct shape, it being of course understood that said wheel is readily rotated with the turn table 13 in bringing a "flat" or "low" point of the wheel rim in position for engagement with said bar, the respective jaw thereof having a slot 38, which is conveniently straddled over a spoke of the wheel under repair as may be required, and more especially in the process of straightening the particular spoke concurrently with the reshaping of the wheel rim.

When not in use the jack seat 29 may be swung to idle position on the vertical guide rod 39 which is slidably disposed through the flanges of said seat at one end of same, the ends of said rod being secured to the lugs 40 formed on one of the legs 6, said lugs being spaced from said seat in giving ample room to slidably adjust said seat vertically on said rod to a suitable working height. The elongated collar 41 is retained at the desired height on said rod between said flanges by its set screw 42, thus firmly retaining said seat at the desired height, and at the same time permitting the swinging of same on said rod from working to idle position as illustrated in Fig. 3, and vice versa.

Figure 3:
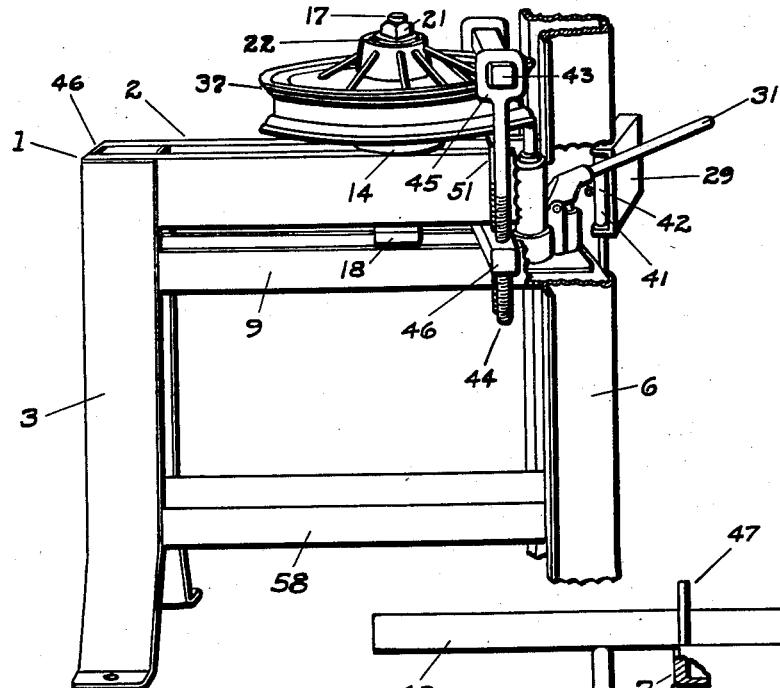
Fig. 3 is a somewhat perspective side view of the device showing the machine as used in exerting bending thrust upward against a selected part of the wheel rim.

When the jack seat 29 is thus swung into idle position access is given to the jack 31 when set upright on the inverted channel 9 as shown in Fig. 3, said jack being expanded upwardly against a point on the side of the wheel rim in bending same into alignment, and in this operation the wheel is clamped downward at points thought most suitable by the operator by the draw bar 43 which is held firmly downward against the wheel rim 37 in opposition to the jack 31, by the vertical eye bolts 44 the eyelets 45 of which engage respective ends of said draw bar and the other ends of which are threaded into the tree-bar 46 which bears upwardly under the channels 2 and above the channel 9 in transverse relation thereto, it being understood that said eye bolts may be threaded into said tree-bar a greater or less amount to give the draw bar 43 the desired co-operation with the jack 31 in realigning the wheel, and it being further understood that said draw bar is shifted along with said eye bolts and said tree-bar, in a longitudinal plane to place said draw bar over selected points of the wheel rim 37, as desired by the operator.

In bending the wheel rim oppositely to the manner illustrated in Fig. 3 the draw bar 43 is placed through the loop 47 formed on the cross channel between the upper extremity of the legs 6, as illustrated in Fig. 4, in position to overhang that portion of the wheel which is to receive downward bending thrust, the jack 31 being tensioned between said wheel portion and said draw bar, the yielding of which under upward pressure of said jack is arrested in cantilever manner by said loop and a heel point 48 on the cross channel 7 on the other side of said loop from the wheel. In order to resist the downward thrust of said jack in applying the bending action to the wheel rim at the desired points the thrust bar 49 is first shifted under said rim to a suitable position, the ends of said thrust bar resting upon the heads 50 of the thrust screws 51, which are threaded through the tree bar 46, said bar resting on the inverted channel 9, and said thrust bar being adjusted to required working heights by screwing said thrust screws into said tree bar a greater or less amount. Still referring to Fig. 4, the jack 31 is also used in such operation by tensioning same directly between the wheel rim and the cross channel 7 as indicated by the dotted lines 52.

In order to hold the wheel under repair in the most stable condition and protect the device itself against undue strain, a steady rest is provided for the upper end of the stud 17. Said steady rest consists of a collar-like socket 54 which fits around the nut 21, said socket having horizontal trunnion means 55 transverse to the channels 2, which engage the free ends of a pair of arms 56, the other ends of said arms being hinged to different ones of the legs 6 considerably above the channels 2. By these features said socket may be swung into engagement with said nut after the wheel in repair has been properly located and secured on the plate 12, said socket being swung out of position with the arms 56 into such position as indicated by the dotted lines 57 of Figure 1, in removing and placing wheels on the device.

Between the lower extremities of the legs 3 and 6, said legs are all conveniently united by a horizontal channel 58, which has a general bracing effect upon the frame 1, and serves as a floor upon which the removable parts of the device and tools sundry thereto may be placed when not in use.

While the description and drawings illustrate in a general way certain elements which may be employed in carrying the invention into effect, it is obvious that many modifications may be made in the various details without departing from the scope of the appended claims, it being understood that the invention is not restricted to the particular examples shown herein.

The invention claimed is:

1. A wheel repairing mechanism comprising a means to secure a wheel rotatably in position for repair, a pair of spaced standards secured to said means, said standards being spaced apart and spaced from said means, a C bar having a pair of mutually facing jaws, one of same serving to be hooked in the rim of the wheel under repair, and a jack seat adapted to be swung to a jack seating position across said standards on the other side of said standards from said wheel securing means and adapted to be swung from said jack seating position to give access to the wheel as desired, said jack seat having a means which removably and overhangingly supports a jack and directs said jack to the other jaw of said C bar when said jack seat is in position across said standards.

2. A wheel repairing mechanism comprising a means to secure a wheel rotatably in position for repair, a pair of spaced standards secured to said means, said standards being on different sides of a plane passing through the axis of the wheel, a C bar having a pair of mutually facing jaws, one of which serves to be hooked in the rim of the wheel under repair, and a jack seat adapted to be swung to a jack seating position across said standards on the other side of said standards from said wheel securing means and adapted to be swung from said position to give access to the wheel as desired, said jack seat having means which removably and overhangingly supports a jack and directs said jack to the other jaw of said C bar, and said jack seat being bodily adjustable as to position along a line parallel to the axis of the wheel.

3. A wheel repairing mechanism comprising a means to secure a spoked wheel rotatably in position for repair, a pair of spaced standards secured to said means, said standards being on different sides of a plane passing through the axis of the wheel, a C bar having a pair of mutually facing jaws, one of which has forks serving to be hooked in the rim of the wheel and straddle a spoke of the wheel, the other of which jaws has a socket facing the other jaw, and a jack seat adapted to be swung to a jack seating position across said standards on the other side of said standards from said wheel securing means and adapted to be swung from said position to give access to the wheel as desired, said jack seat having a means which removably and overhangingly supports a jack when across said standards and directs said jack to said socket of said C bar, said seat being bodily adjustable as to position along a line parallel to the axis of the wheel.

4. A wheel repairing mechanism having means which supports a wheel rotatably in position for repair, a standard means, a C bar having a pair of mutually facing jaws, one of same serving to be hooked in the rim of the wheel under repair, and a jack seat means pivoted to said standard means and adapted to be swung into jack seating position and out of jack seating position giving access to the wheel as desired, said jack seat having a means which supports a jack and directs the same to the other jaw of said C bar when the latter is engaging the rim of the wheel.

5. A wheel repairing mechanism having means which supports a wheel rotatably in position for repair, a standard means, a C bar having a pair of mutually facing jaws, one of the same serving to be hooked in the rim of the wheel under repair, and a jack seat movably carried by said standard means and adapted to be moved into jack seating position and out of jack seating position to give access to the wheel as desired, said jack seat having a means which supports a jack and directs same to the other jaw of said C bar when engaging the rim of the wheel.

6. In a wheel repairing mechanism, a frame, a wheel support on said frame for supporting a wheel in position for repair, a standard forming part of and rising from said frame, said standard having an opening therein, a jack seat mounted on said standard adjacent to said opening, a jack on said seat, and a C bar adapted to be disposed in said opening with one jaw engaged with the rim of a wheel on said support, and the other engaged by said jack.

7. In a wheel repairing mechanism, a frame, a wheel support on said frame for supporting a wheel in position for repair, a standard forming a part of and rising from said frame, said standard having an opening therein, a jack seat slidable on said standard adjacent to said opening, means to hold said seat in adjusted positions, a jack on said seat, and a C bar adapted to be disposed in said opening with one jaw engaged with the rim of a wheel on said support and the other engaged with said jack.

8. In a wheel repairing mechanism, a frame, a wheel support on said frame for supporting a wheel in position for repair, a pair of members disposed in spaced parallel relation rising from said frame and constituting a standard, a jack seat bridging said members and slidable on the latter, means for holding said seat in adjusted position, a jack on said seat, and a C bar adapted to be disposed between said members with one jaw engaged with the rim of a wheel on said support and the other engaged with said jack.

HENRY C. SCHILDMEIER.